July 22, 1952        J. C. PACKARD        2,603,940

HOROLOGICAL APPARATUS

Filed June 20, 1947        7 Sheets-Sheet 1

INVENTOR.
John C. Packard
BY Paul A. Weilein
ATTORNEY

July 22, 1952 J. C. PACKARD 2,603,940
HOROLOGICAL APPARATUS
Filed June 20, 1947 7 Sheets-Sheet 2

INVENTOR.
John C. Packard
BY Paul A. Weilein
ATTORNEY

July 22, 1952 J. C. PACKARD 2,603,940
HOROLOGICAL APPARATUS
Filed June 20, 1947 7 Sheets-Sheet 3

INVENTOR.
John C. Packard
BY Paul A. Weilein
ATTORNEY

July 22, 1952   J. C. PACKARD   2,603,940
HOROLOGICAL APPARATUS
Filed June 20, 1947   7 Sheets-Sheet 4
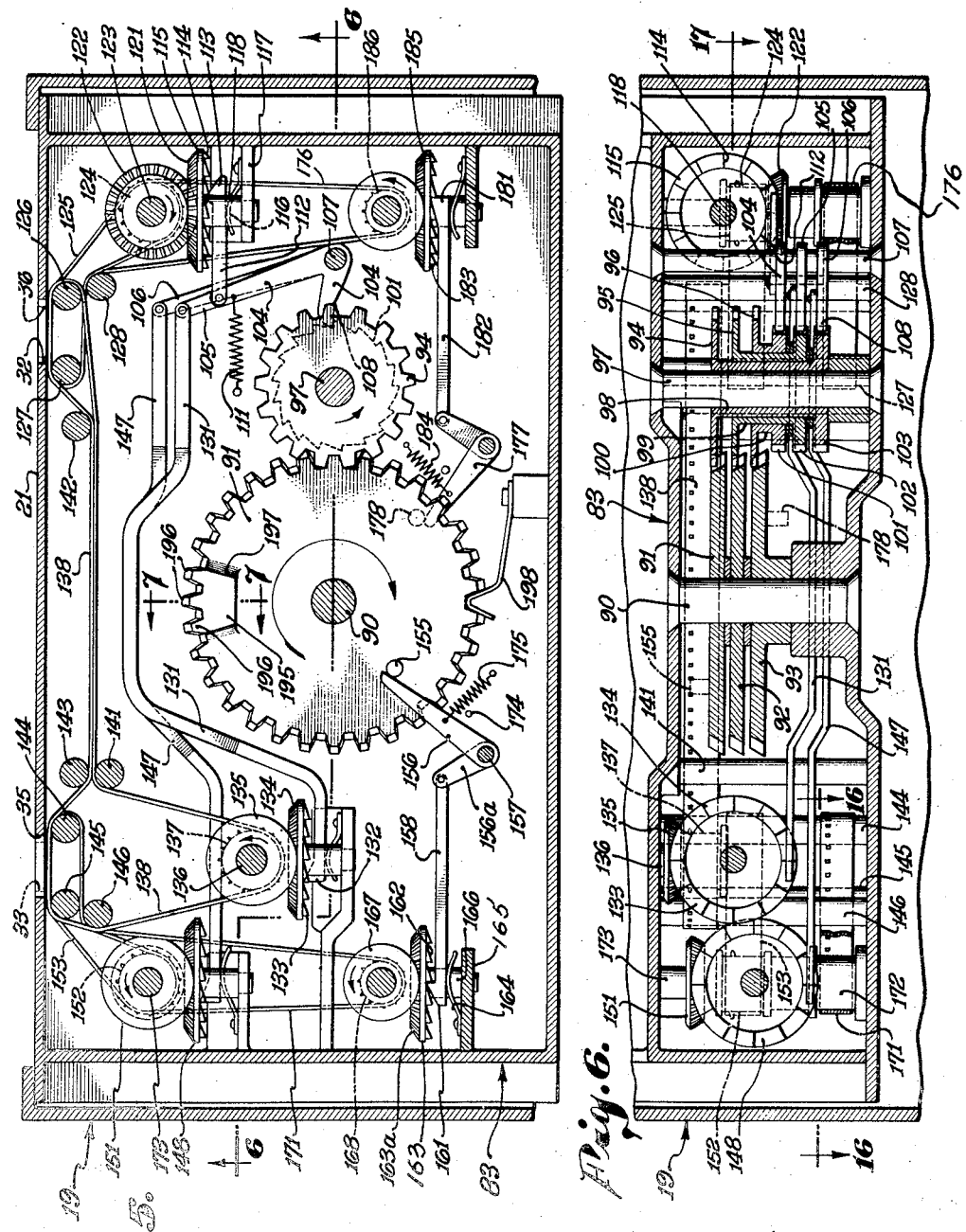
INVENTOR.
John C. Packard
BY Paul A. Weilein
ATTORNEY July 22, 1952   J. C. PACKARD   2,603,940
HOROLOGICAL APPARATUS
Filed June 20, 1947   7 Sheets-Sheet 5
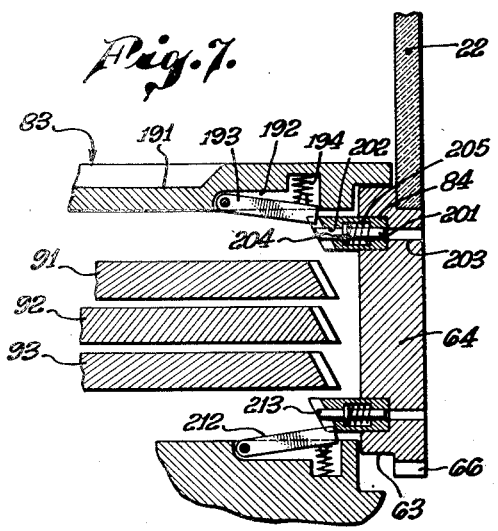
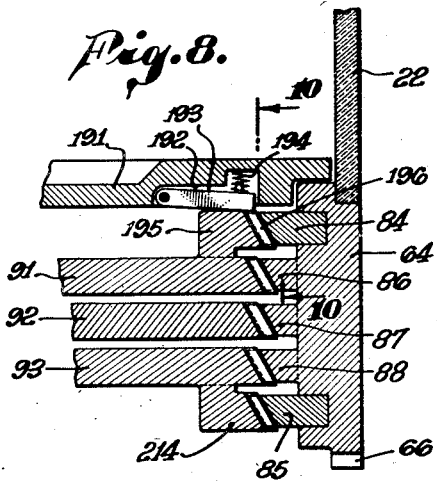
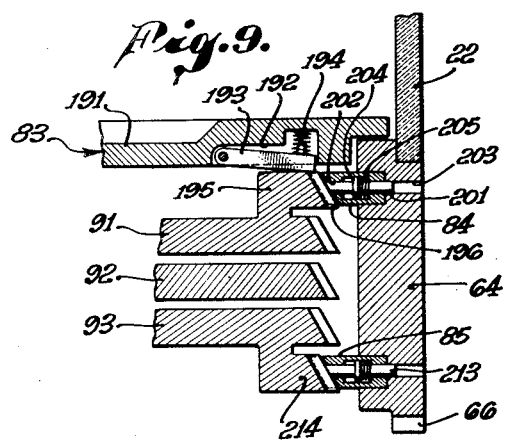
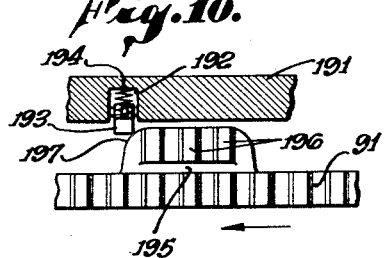
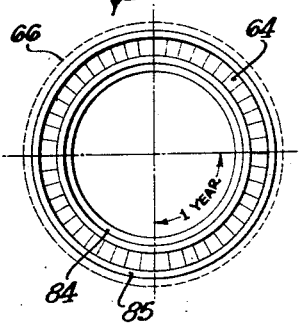
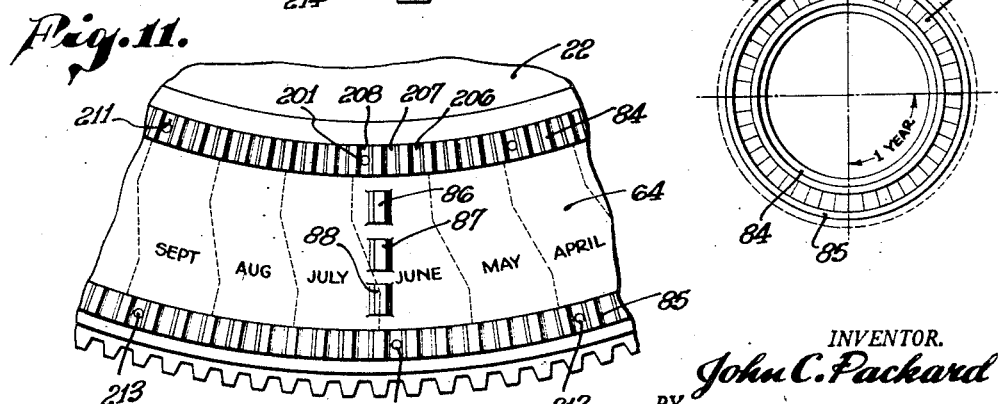
INVENTOR.
John C. Packard
BY Paul A. Weilein
ATTORNEY July 22, 1952 J. C. PACKARD 2,603,940
HOROLOGICAL APPARATUS
Filed June 20, 1947 7 Sheets-Sheet 6
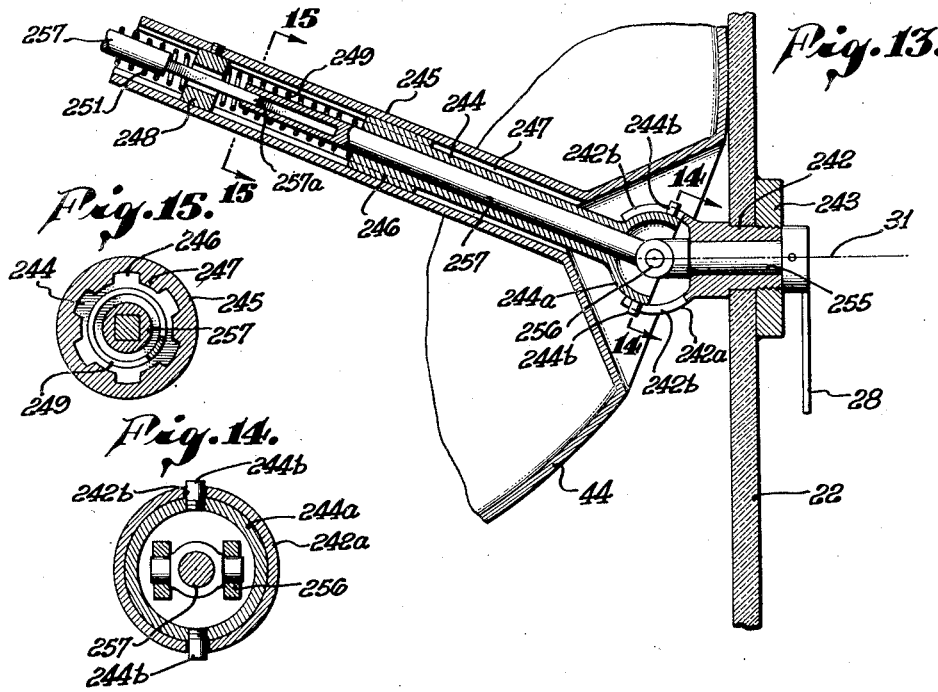
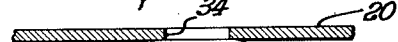
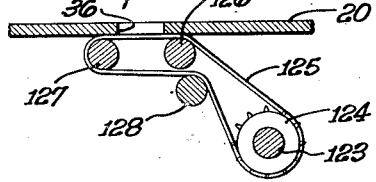
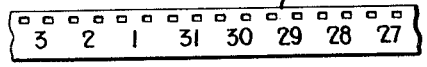
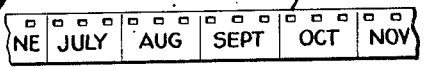
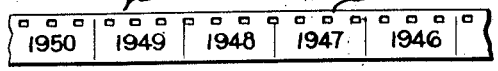
INVENTOR.
John C. Packard
BY
Paul A. Weilein
ATTORNEY July 22, 1952 J. C. PACKARD 2,603,940
HOROLOGICAL APPARATUS
Filed June 20, 1947 7 Sheets-Sheet 7
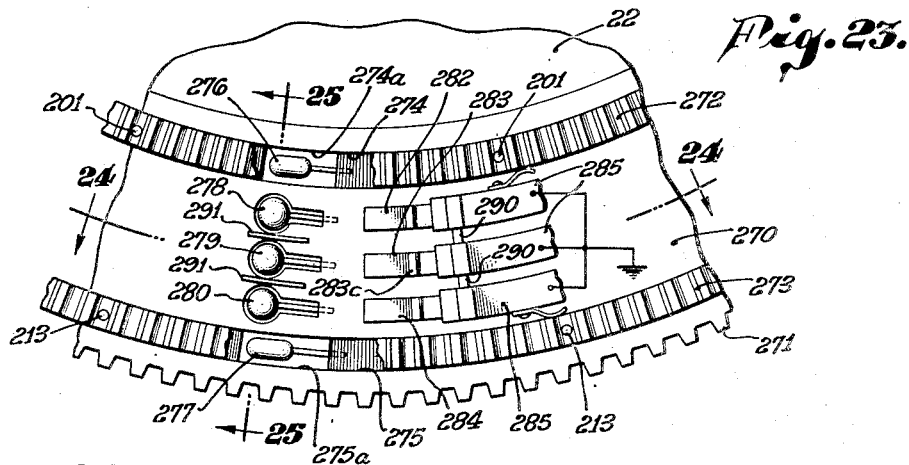
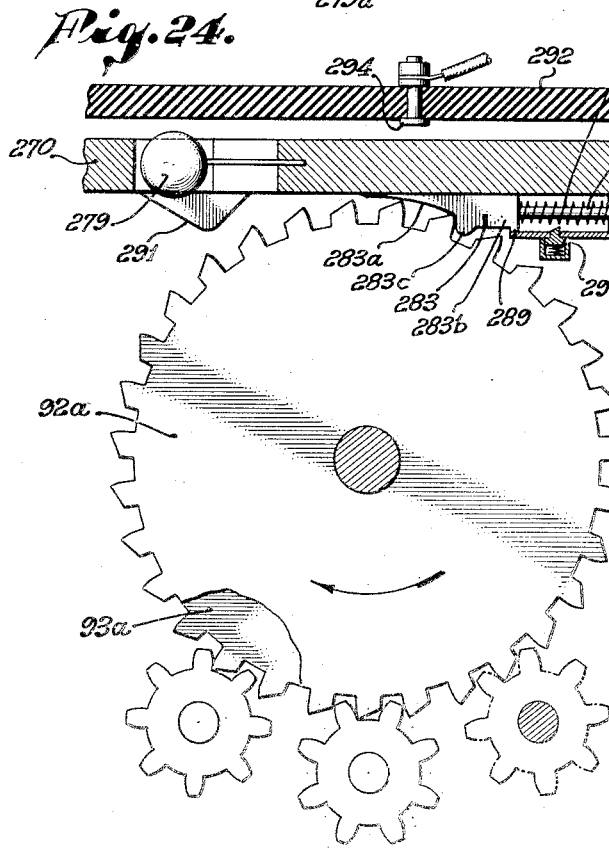
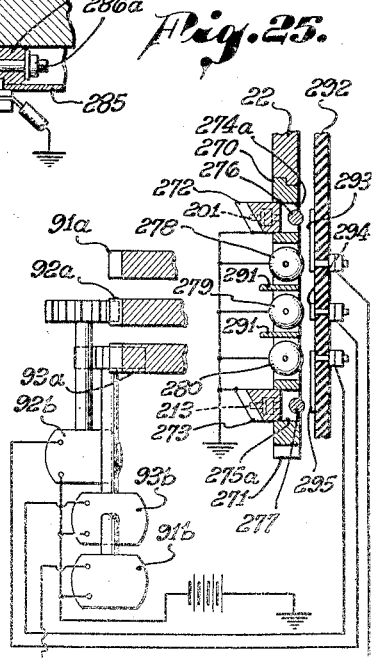
INVENTOR.
John C. Packard
BY
Paul A. Weilein
ATTORNEY Patented July 22, 1952

2,603,940

UNITED STATES PATENT OFFICE 2,603,940

HOROLOGICAL APPARATUS

John C. Packard, Los Angeles, Calif.

Application June 20, 1947, Serial No. 755,901

24 Claims. (Cl. 58—44)

This invention relates to clocks, and particularly to clocks for indicating the date and the hour, as well as related data, at any point in the world.

It is an object of this invention to provide a clock adapted to serve as an educational time piece, which displays the geographical aspects of time keeping, as well as the horological significance of the imaginary meridians dividing the face of the earth.

It is a further object of this invention to provide a clock which indicates the time at any given instant at any point in the world.

It is another object of this invention to provide a clock which indicates simultaneously the year, season, month, and day of the month at any region on the face of the earth, whereby to effectively illustrate the significance of the Greenwich meridian and of the international date line.

It is another object of this invention to provide a clock embodying a rotatable globe in combination with a source of light representing the sun, whereby the light conditions, i. e., day or night, are visually illustrated, showing the astronomical relationship between the sun and the earth.

It is still another object of this invention to provide such a clock having an auxiliary power source controlled by the clock, for performing some of the indicating functions.

This invention possesses many other advantages and has other objects which may be made more easily apparent from a consideration of a number of embodiments of the invention. For this purpose there are shown two forms in the drawings accompanying and forming part of the present specification. These forms will now be described in detail, illustrating the general principles of the invention; but it is to be understood that this detailed description is not to be taken in a limiting sense since the scope of the invention is best defined by the appended claims.

In accordance with this invention, there is provided a clock having a transparent, circular rotatable dial upon which are marked the degrees signifying the meridians of the globe. Circumjacent the edge of the dial is a cooperating non-rotatable index ring on which are marked the twenty four hours of the day in two series of twelve hours each. Also on the non-rotatable ring are marked graduations indicating the sixty minutes in an hour, and cooperating therewith is a single clock hand extending from the center of the dial and rotatable independently thereof.

The dial is rotated by suitable mechanism at the rate of one revolution per day so that the cooperation between the meridian index on the dial and the hour index on the circumjacent ring indicates the hour of the day at any given earthly meridian. The hand is rotated at a rate of one revolution every hour so that in cooperation with the minutes index it shows the minutes of the hour.

Within the body of the clock and mounted immediately behind the transparent dial is a globe representing the earth. One end of the globe axis is mounted at the center of the dial and the globe rotates synchronously with the dial. A light source is placed within the body of the clock near the top thereof. Light rays falling on the globe correspond generally to sunlight falling on the earth so that by looking through the transparent dial, the observer may see wherein it is night and wherein it is day throughout the earth at the particular moment of observation.

The panel of the clock also includes numerous windows past which may be moved indicia showing the year, season, month, day of the month and day of the week. Inasmuch as portions of the earth generally the far east, experience a date and day which is one day in advance of the western world and of the Americas, two series of windows are provided for indicating respectively in connection with the appropriate indicia the advanced and the delayed month, day of the month and day of the week.

Inasmuch as the angularity of the axis of the earth with respect to the sun changes during the year, means are provided for steadily oscillating the axis of the globe so that the light rays falling thereon always are commensurate with the season of the year.

The mechanical and gearing details whereby the various foregoing effects may be achieved will now be described with reference to the accompanying drawings, which are mainly schematic.

In the drawings:

Figure 5 is a cross section on an enlarged scale, taken substantially as indicated by line 5—5 of Figure 3, certain parts being omitted to clarify the showing;

Figure 6 is a fragmentary transverse section taken substantially as indicated by line 6—6 of Figure 5;

Figure 7 is a detail section taken substantially as indicated by line 7—7 of Figure 5, but showing a different operating position of the parts;

Figures 8 and 9 are sections similar to Figure 7 but showing other operating positions of the parts;

Figure 10 is a detail section taken substantially as indicated by line 10—10 of Figure 8;

Figure 11 is a detail elevation of a portion of the main driving gear;

Figure 12 is a diagrammatic showing of the entire driving gear of Figure 11;

Figure 13 is a detail section, taken substantially as indicated by line 13—13 of Figure 1;

Figures 14 and 15 are detail sections taken substantially as indicated by the correspondingly numbered lines of Figure 13;

Figures 16 and 17 are fragmentary sections taken substantially as indicated by the correspondingly numbered lines of Figure 6;

Figures 18 to 22 inclusive are fragmentary elevations of various indicators utilized in the clock;

Figure 23 is a detail elevation similar to Figure 11, but showing a fragment of the main driving gear of a modified form of clock;

Figure 24 is a fragmentary section on an enlarged scale, taken substantially as indicated by line 24—24 of Figure 23; and Figure 25 is a fragmentary cross section, taken substantially as indicated by line 25—25 of Figure 23, incorporated in a wiring diagram of the modified form of clock.

Figure 1:
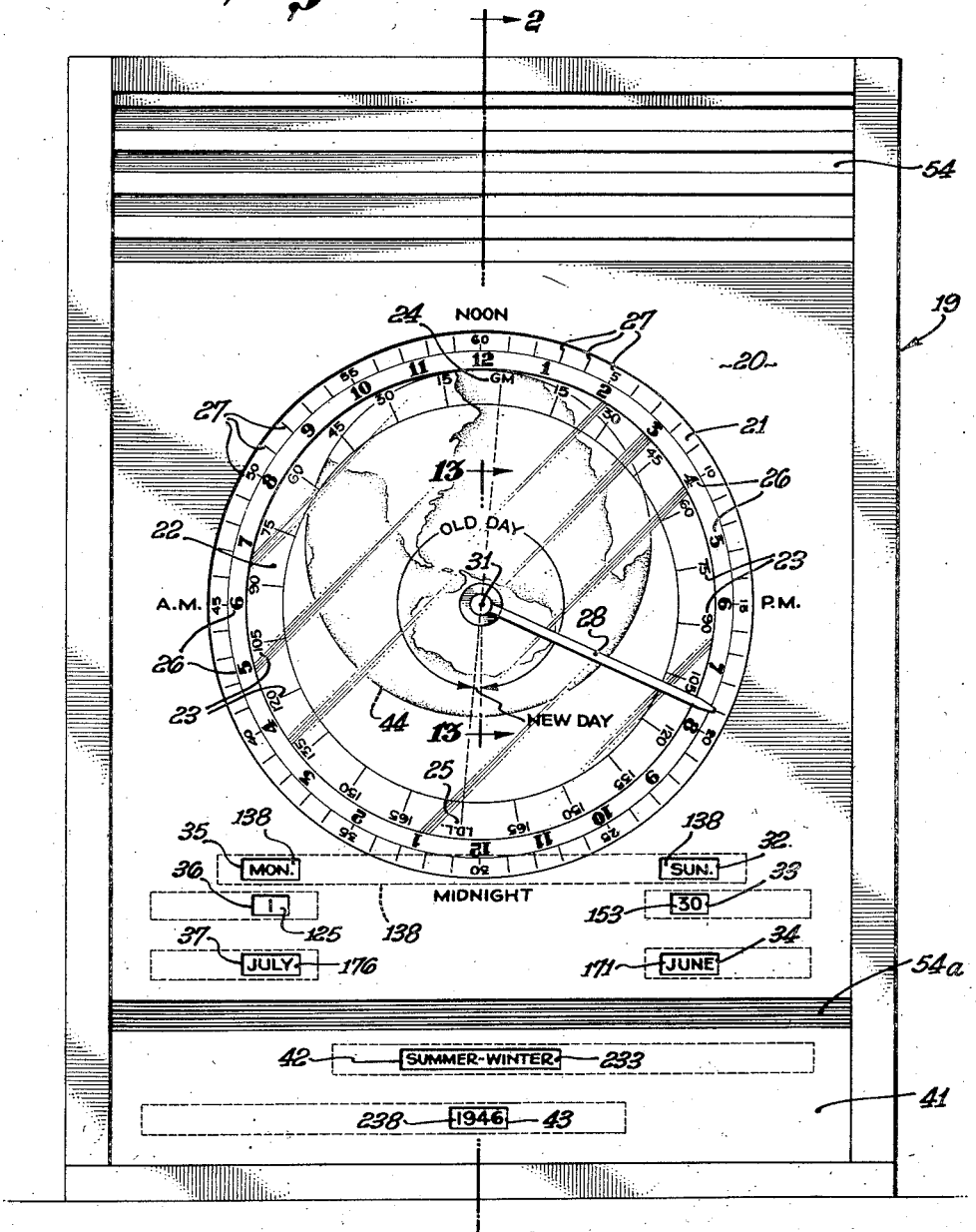
Figure 1 is a front elevation of a clock incorporating the features of the invention.
Figure 2:
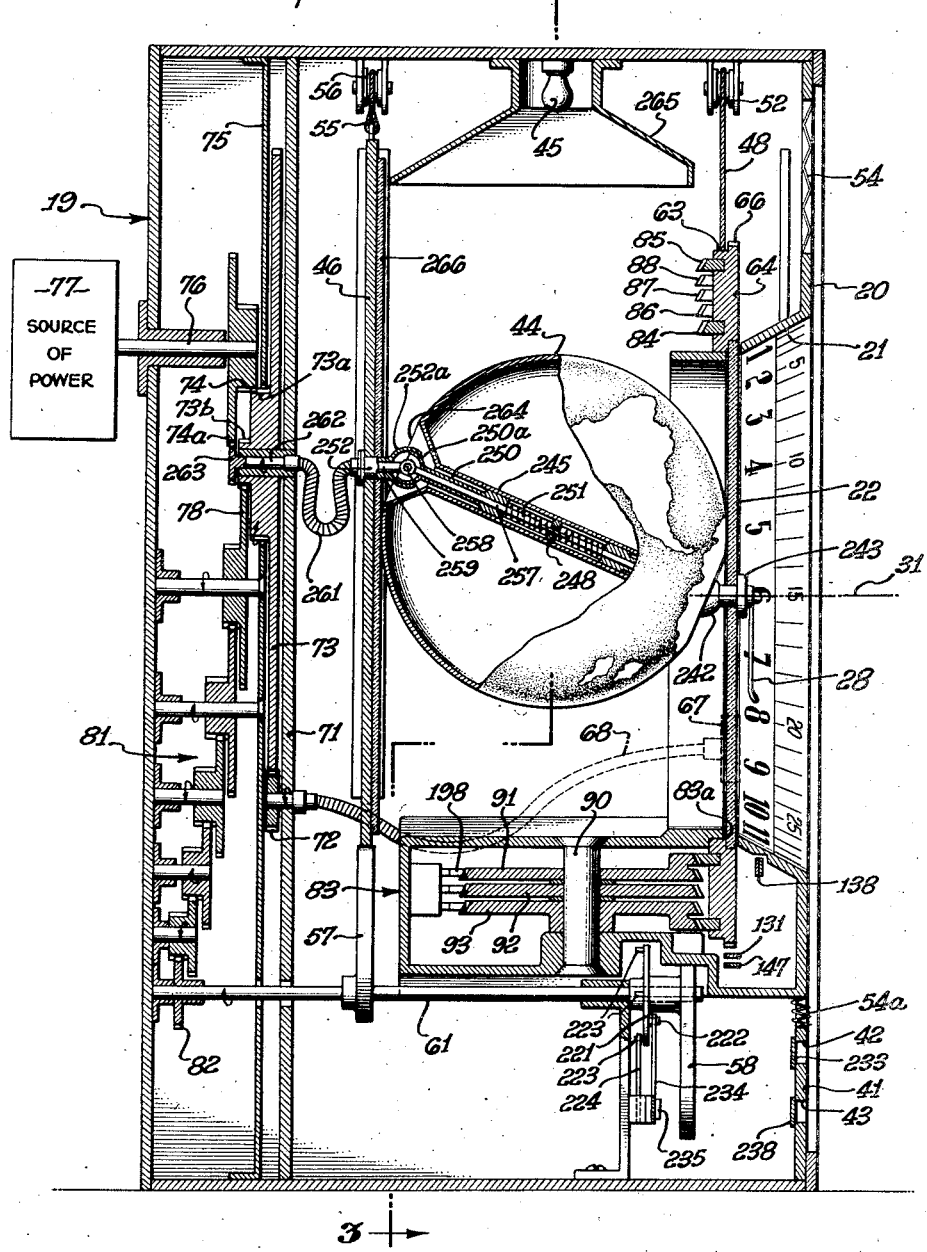
Figure 2 is a vertical section, taken substantially as indicated by line 2—2 of Figure 1.

Referring to Figures 1 and 2 of the drawings, 20 denotes the front panel of the clock, a circular opening defined by an inclined edge wall 21 being formed in the panel 1 for viewing a rotatably mounted transparent dial 22. By suitable mechanism located in the clock housing 19, dial 22 is caused to rotate once every 24 hours. Around the edge of the dial 22, indices 23 spaced at each 15°, are imprinted, representing the earthly meridians. The zero meridian is marked GM for the Greenwich meridian, as shown at 24, and the 180th meridian is marked IDL, signifying the international date line, as shown at 25.

Cooperating with the meridian indices 23, indices 26 representing the hours of the day are imprinted around the inner edge of the wall 21 adjacent the outer edge of the dial 22. Imprinted around the outside of the hour indices 26 are 60 graduations 27 indicating the minutes of the hour. Cooperating with these indicia is a rotatable hand 28 which turns about the same axis 31 as does the dial 22, but independently thereof. By suitable mechanism, hand 28 is caused to turn at the rate of one revolution each hour. Thus, in the position of the parts shown in Figure 1, the clock indicates that the time for example at 120° longitude west of Greenwich, is between 4 and 5 a. m.

Below and to the right of dial 22, windows 32, 33 and 34, are provided in the panel 20 for indicators showing respectively, the day of the week, the day of the month, and the month. This information is valid only for that portion of the world still experiencing the old or delayed day, that is from that meridian opposite twelve midnight (the bottom 12) in a counterclockwise direction to the international date line. Thus, in the particular setting of the clock shown in Figure 1, the delayed indications apply to all of the world from a meridian approximately 175° east of Greenwich eastwardly, to the international date line. This, it will be seen in this particular instance, is a very large proportion of the earth's surface.

The advanced day of the week, day of the month and month are indicated through the windows 35, 36 and 37 respectively, located below and to the left of dial 22. These indicia are valid for that portion of the globe extending from the international date line eastwardly (counterclockwise) to that meridian registering with twelve midnight. Thus, the particular setting of the clock shown in Figure 1, it is Monday, July 1, in that segment of the globe covering a small proportion of the earth's surface extending between the meridian about 175° east of Greenwich and the international date line.

Means are provided within the clock for effecting change of the information indicated at the windows 32—37 at the moment that it is midnight at the international date line.

In the lower portion of the clock in the housing front plate 41, are windows 42 and 43 for indicators showing respectively the season and the year. The information indicated at these windows changes at the proper moment by means of mechanism to be described hereinafter. Inasmuch as a given season in the northern hemisphere is accompanied by the opposite season in the southern hemisphere, the indication appearing at window 42 must of course designate both seasons, as for example, "summer-winter," as shown in Figure 1.

In addition to the visual indicators operating as described above on the face and panel of the clock, the clock is provided with a terrestrial globe 44 (Figure 2) mounted directly back of the transparent dial 22. The globe is disposed with one of its poles, in this case the south pole, adjacent the center 31 of the dial 22, and is arranged to rotate synchronously with the dial. A source of light 45 is provided within the housing 19 of the clock above the globe 44, so that the rays thereof falling on the globe will simulate sunlight falling on the earth.

Inasmuch as the sun's declination changes from season to season, means are provided for shifting the axis of the globe 44 with respect to the light source 45 in a corresponding manner. To this end the south pole of the globe 44 is mounted adjacent the dial axis 31, while the north pole is mounted on a vertical plate 46.

The panel 20 on which the dial 22 is rotatably mounted is in turn guided in the clock housing 19 for vertical reciprocation by means of guide flanges 47 (Figure 3), which cooperate with guide ways in the housing 19. Panel 20 and the machinery mounted thereon is supported by a pair of cords 48 secured through rings 51 to the top of the panel 20. Cords 48 extend upwardly from the rings 51 over sheaves 52, rotatably mounted in the housing 19 and thence downwardly for attachment to the counterweights 53. The panel 20 and associated machinery is thus suspended in balance for vertical reciprocation. To accommodate this reciprocation of panel 21 and still present a closed appearance at the face of the clock, the upper and lower edges of the panel 21 are joined respectively to the upper part of housing 19 and to the front plate 41 by foldable elements 54 and 54–a. The vertical plate 46 supporting the north pole of the globe 44 is similarly mounted in housing 19 for vertical reciprocation, being provided with a pair of cords, one of which is shown at 55, which extend over sheaves 56 and are counterweighted as before.

Complementary reciprocatory motions are imparted to plate 46 and to panel 20 by means of appropriately shaped cams 57 and 58 respectively, mounted on a horizontal shaft 61 in oppositely disposed relation, so that as cam 57 rises and lifts plate 46, cam 58 drops and lowers the panel 20, and vice-versa.

A supporting roller 62 is rotatably mounted on the panel 20 adjacent each corner thereof, the edges of the rollers 62 cooperating with a cylindrical shoulder 63 of an annular plate 64. Plate 64 in turn supports the dial 22, which is fixedly secured thereto by any suitable means. The dial and annular plate are thus securely mounted for rotation on the panel 20. Extending from the outer edge of the plate 64 are gear teeth 66 by means of which the ring and dial assembly may be rotated in the rollers 62. Cooperating with the gear teeth 66 is a small pinion 67 rotatably mounted on the panel 20. Pinion 67 is driven through a flexible shaft 68 which extends rearwardly and is journaled in an intermediate vertical wall 71 of the housing 19 (Fig. 2). Shaft 68 is in turn driven by a pinion 72 fixed thereto, which meshes with a gear 73 also journaled in intermediate wall 71. Gear 73 has a smaller gear 73-a formed integrally therewith which is in turn driven by a pinion 74 journaled between the rear wall of the housing 19 and a second intermediate wall 75 through which the reduced gear 73-a extends axially. Pinion 74 is fixed on a shaft 76, which extends from the rear of the housing 19 and is connected to an appropriate source of power 77 for rotating at a predetermined constant rate.

From the above description it will be seen readily that shaft 76 imparts constant speed rotation at a reduced rate to the annular plate 64 and dial 22, the gearing ratios being so chosen that plate 64 and dial 22 rotate once every 24 hours. Referring to Figure 1, it will be seen that the rotation of dial 22 enables an observer to determine the hour of day at any (earthly) meridian merely by correlating the longitude indicia 23 on the dial 22 with the hour marks 26 on the inclined wall 21.

Returning now to Figure 2, it will be seen that gear 73, in addition to the reduced portion 73-a, has a portion 73-b, of still smaller radius, which meshes with a gear 78 journaled between the rear wall of the housing 19 and the intermediate wall 75. By means of a train of reduction gearing, indicated generally by 81, the rotation of gear 78 is imparted to a gear 82 secured on the horizontal shaft 61. The ratio between the gear 73-b and the gear 82 is such that the shaft 61 is rotated one turn every 365¼ days. Such rotation of shaft 61 causes the cams 57 and 58 to impart reciprocation in opposite directions to the plate 46 and panel 21 respectively. This in turn causes the globe 44 as viewed through the transparent dial 22 to tilt back and forth with respect to the light source 45, thereby simulating the changing declination of the sun with the changing seasons.

The mechanism by which the proper information is displayed through the several windows 32 to 37, 42 and 43, will now be described.

Figure 3:
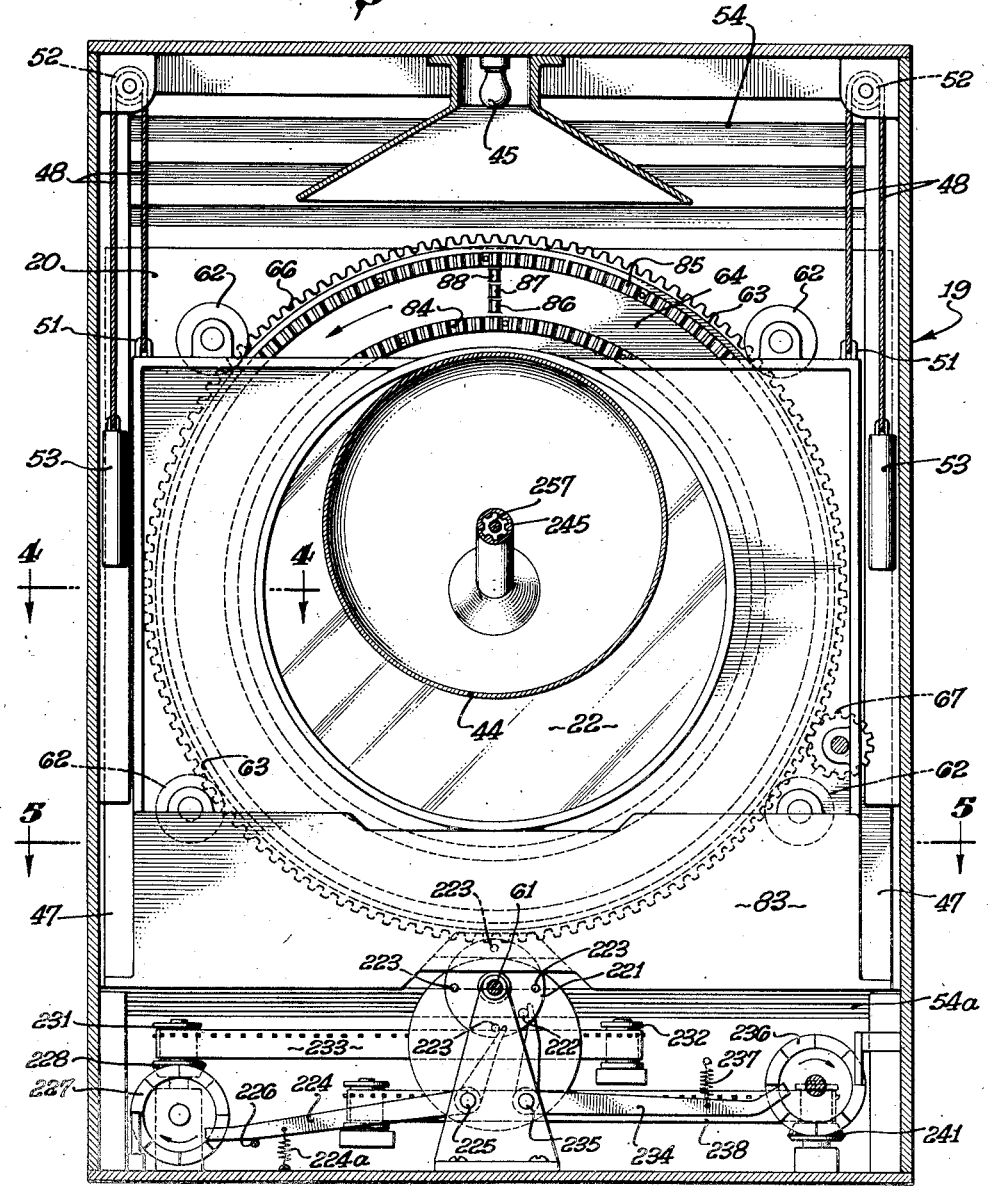
Figure 3 is a transverse section taken substantially as indicated by line 3—3 of Figure 2, the parts being in a different operative position.
Figure 4:
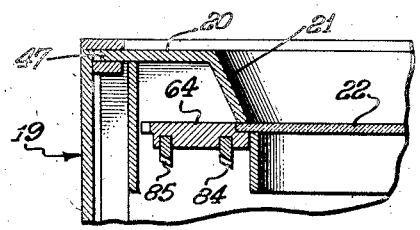
Figure 4 is a fragmentary cross section taken substantially as indicated by line 4—4 in Figure 3.

At the bottom of panel 20 and extending into the clock housing 19, is a generally rectangular gear housing 83 (see Figures 2, 3, 5 and 6). Certain details of the housing have been omitted from the first two named figures in the interest of over-all clarity. As seen in Figure 2, the front end of housing 83 has a horizontal slot 83-a through which the annular plate 64 and the edge of the dial 22 extend into the gear housing. The face of an annular plate 64 is divided into five gear members, of progressively changing radii, as shown in Figure 3. The innermost and outermost gears comprise bevel ring gears 84 and 85 respectively. Each of the three intermediate gears comprises a single beveled tooth 86, 87 and 88 respectively, which are aligned radially of the annular ring 64. The teeth 86, 87 and 88 serve to operate gears 91, 92 and 93, respectively, shown in Figures 2 and 3. The gears 91, 92 and 93 each having 31 beveled teeth, are concentrically mounted in spaced axial relation on a vertical shaft 90, fixedly mounted between the top and bottom walls of the gear casing 83. The teeth 86, 87 and 88, and the teeth on the cooperating gears 91, 92 and 93 are so formed that with each complete revolution of the vertically mounted annular plate 64, each of the gears 91, 92 and 93 will be rotated or advanced by one tooth or ⅟₃₁ of a complete revolution.

Referring now to Figure 6, it will be seen that the gears 91, 92 and 93 mesh respectively with the three concentrically mounted, axially spaced pinions 94, 95 and 96. The pinions are mounted for free rotation on a vertical shaft 97 extending between the top and bottom walls of the gear casing 83, and are formed integral with rotatable sleeves 98, 99 and 100 which transmit pinion rotation to integrally formed ratchet wheels 101, 102 and 103 respectively. The innermost of the sleeves 98 is formed integral with the pinion 94 and the ratchet wheel 103, and is therefore the longest of the three sleeves, inasmuch as it must serve as a journal surface for the intermediate sleeve 99 formed integral with the pinion 95 and the ratchet wheel 102. The shortest of all, and of greatest diameter, is the sleeve 100 which is formed integral with the pinion 96 and the ratchet wheel 101, and is journaled on the outer surface of intermediate sleeve 99.

It will thus be seen that the intermittent rotation of beveled gear 91 by the single tooth 86, produces corresponding rotation of the pinion 94 and the ratchet wheel 103. Similarly the tooth 87 causes rotation of the ratchet wheel 102, and the tooth 88 causes rotation of the ratchet wheel 101.

The ratchet wheels 101, 102 and 103 are engaged by and oscillate the bell cranks 104, 105 and 106, respectively, mounted on a vertical shaft 107, the short arm portion of each being formed appropriately into a dog such as 108 which engages the teeth of the cooperating ratchet wheel.

An exemplary showing of these mechanisms is to be found in Figure 5 showing the ratchet wheel 101, which, upon its intermittent counterclockwise rotation, engages the dog 108 of the bell crank 104 and oscillates it clockwise about the shaft 107 and against the force of a retracting tension spring 111 connected near the outer end of the bell crank 104. Pivoted at the outer end of the ball crank 104 is a short pitman 112, which has a hook-like dog 113 integrally formed on the end thereof. Dog 113 is pressed into engagement with the ratchet teeth 114 formed on a wheel 115, by means of a small leaf spring 116 mounted on a short bracket 117 extending from the side wall of the gear housing 83. Wheel 115 is freely pivoted on a shaft 118, also mounted on the bracket 117, and has a beveled gear 121 on the side opposite the ratchet teeth 114. Gear 121 meshes with a beveled gear 122 journaled on a vertical shaft 123. Preferably integrally formed with the body of the gear 122 is a sprocket wheel 124, the teeth of which engage a ribbon 125 and move it intermittently past the window 36. As best seen in the detail view, Figure 17, there are provided cooperating guide rollers 126, 127 and 128, which guide the ribbon 125 past the window 36. The outer surface of the ribbon 125, which is a continuous ribbon, has numerals imprinted thereon, as shown in Fig. 19, for display upon registry with the window 36, the ribbon being so positioned in the sprocket as to indicate the advanced day of the month.

In a similar manner, the arm 105 also includes an integrally formed dog portion which engages the intermediate ratchet wheel 102. This engagement is substantially identical with that illustrated in Figure 5 for the bell crank 104 and the ratchet wheel 101. On the outer end of the bell crank 105 is pivotally mounted the pitman 131, which has a pushing dog member 132 provided on the end thereof. Dog 132 intermittently turns the ratchet wheel 133 in response to movement of the bell crank 105 by the ratchet wheel 102. A beveled gear 134 formed on the ratchet wheel 133, meshes with a gear 135 journaled on a shaft 136, and having integrally formed therewith the sprocket cylinder or drum 137. The sprocket teeth of the cylinder 137 engage a ribbon 138. Notations of the days of the week (see Fig. 18) imprinted on the outer surface of ribbon 138 are brought into successive registry with the windows 35 and 32 by means of the guide rollers 141, 126, 127, 142, 143, 144, 145 and 146. It will be noted that adjacent the window 36 the ribbon 138 rides on the same guide rollers 126 and 127 as are employed to position the ribbon 125 behind the window 36, the ribbon 138 simply riding on a portion of the rollers 126 and 127 above the ribbon 125. It will also be noted that the ribbon 138 serves to indicate both the advanced day of the week, through window 35, and the delayed day of the week, through window 32. Such a double function is not possible for those ribbons which, like ribbon 125, indicate the day of the month, nor is it possible for those ribbons which indicate the month, because of the fact that different months have a different number of days, and for the reason that the advanced month and the delayed month are not shifted at the same moment.

The bell crank 106 is operated by the ratchet wheel 103 in a manner quite similar to that described for the other bell cranks 104 and 105. Through the pitman 147 pivotally connected to the end thereof, the bell crank 106 intermittently advances the ratchet wheel 148 which is arranged to drive the bevel gear 151, which is connected with the sprocket cylinder 152. Cylinder 152 engages and drives a ribbon 153, which is guided past the window 33 by means of guide rollers 144 and 145 mentioned. As best seen by reference to Figures 1 and 5, the intermittent movement of ribbon 153 past the window 33 is the full converse of the guiding of ribbon 125 past window 36, and reference to Figure 17 is made for a better understanding of the details.

It will be understood that the bell cranks 105 and 106 employ springs similar to the spring 111 for biasing them in a direction to cause their ratchet engaging dog members to engage the ratchet teeth of the respective ratchets 102 and 103.

The intermittent movement of the month indicators past the windows 34 and 37 respectively remains to be described. As seen in Figure 5, a boss 155 is formed on the upper surface of the gear 91 and is positioned to engage a lever arm 156, fixed near the upper end of an oscillatable vertical shaft 157. A short arm 156-a is fixed on shaft 157 below the lever 156 so as to oscillate therewith, and has pivoted on its outer end a pitman 158 having formed on the end thereof a hook dog 161 pressed into engagement with the teeth 162 of a ratchet wheel 163 by means of a leaf spring 164. Leaf spring 164 is mounted on a small bracket 165 extending from a side wall of the gear case 83. The shaft 166 of the ratchet wheel 163 is also mounted in the bracket 165, ratchet wheel 163 meshes through a bevel gear portion 163-a with a bevel gear 167 on which is integrally formed the sprocket cylinder 168. The cylinder 168 engages and intermittently moves a ribbon 171 bearing the names of the months (Fig. 20) and which extends forwardly toward the panel 20, being guided on rollers 146, 144, 145 and 172 past the window 34, shown in Figure 1. As shown in Figure 6, the guide member or spool 172 is freely journaled at the bottom of the same shaft 173 which supports freely the spool 152 of the delayed day of the month ribbon 153. A fragmentary detail of the ribbon 171 and its guide members is shown in Figure 16.

Briefly, intermittent motion of the delayed month ribbon 171 is effected as follows:

Clockwise rotation (Figure 5) of gear 91 in each revolution brings boss 155 into engagement with the long arm of the bell crank 156, swinging the bell crank 156 on the shaft 157 and moving pitman 158 to the left, causing the dog 161 to ride over the ratchet teeth 162. The camming between the dog 161 and the tooth 162, coupled with the frictional hindrance in the assembly of the ribbon 171, restrains the ratchet wheel 163 from rotation during this operation. At a predetermined point in the rotation of gear 91, the arm 156 slips from the boss 155 and is returned to a stop member 174 by means of a tension spring 175 attached to the bell crank 156. This retraction of the bell crank causes pitman 158 to move to the right, and due to the engagement of the dog 161 with one of the ratchet teeth 162, the ratchet wheel 163 is turned through a corresponding arc. A corresponding movement is transferred to the ribbon 171 by the sprocket 168, and it is to be understood that the parts are so proportioned that the advance of the ribbon 171 causes the next succeeding month to be displayed through the window 37.

The mechanism for moving the ribbon 176 displaying the advanced month is quite similar to that just described. Thus the bell crank 177 is operated by a depending boss 178 on the gear 93, and the dog 181 on the end of the pitman 182 operated by bell crank 177 is formed as a pushing dog instead of a hook or pulling dog, as may be readily seen in Figure 5.

Operation of the advanced month ribbon 176 is similar to that of the delayed month ribbon 171. Once each revolution of the gear 93, the boss 178 swings the bell crank 177, operating the pitman 182 to retract dog 181 over the ratchet teeth 183. Upon release of the arm 177 by the boss 178, the spring 184 returns the pitman 182 to its initial position and causing the dog 181 to rotate the ratchet wheel 185. The ratchet wheel 185, by suitable bevel gearing rotates a sprocket drum 186 carrying the ribbon 176 thus changing the month appearing at the window 37.

From the above it will be seen that the calendar information displayed at the windows 32 to 37 inclusive is determined solely by the manner in which the gears 91, 92 and 93 are intermittently actuated by the annular gear plate 64. As mentioned previously, the primary actuation of the gears 91, 92 and 93 (Figure 3) by the plate 64 is through the three radially spaced teeth 86, 87, and 88 respectively. Such operation without modification would be satisfactory were it not for the fact that the several months of the year do not have an equal number of days. Accordingly, it is necessary to modify the actuation of the gears 91 and 93, which control, respectively, the delayed date information appearing in the windows 33 and 34, and the advanced date information appearing in the windows 36 and 37. The cooperation between the tooth 87 on the annular plate 64 and the centrally disposed gear 92 need not be modified, inasmuch as the days of the week appear on ribbon 138 controlled by the gear 92, and of course follow each other in unvariant succession.

In order to duly modify the actuation of the gears 91 and 93 by the teeth 86 and 88 respectively, the two ring gears 84 and 85 have been provided on the annular plate 64, as best seen in Figures 2, 7, 8 and 9, rotatably mounted in annular grooves in the plate 64. Suitable means (not shown) may be provided for retaining the rings in their respective grooves.

The mode of cooperation between the inner ring 84 and the gear 91 will now be described, it being understood that a similar description applies to the outer ring 85 and the gear 93. Referring to Figures 7, 8 and 9, it will be seen that the top plate 191 of the gear case 83 has a recess 192 adjacent the ring 84. As shown in Fig. 7, pivoted detent 193 is mounted in the recess 192, one end thereof being pressed outwardly by a small spring 194 and into engagement with the teeth formed on the ring 84, so that until retracted, the detent restrains the ring from rotation with the annular plate 64.

As best seen in Figs. 5 and 8, the upper surface of the gear 91 near its outer edge, has an upwardly projecting cam member 195 in which are three outwardly facing supernumerary teeth 196 disposed directly above three of the regular teeth of the gear 91. An inclined surface 197 is formed on the advancing side of the cam member 195 to engage the detent 193, so that with each revolution of the gear 91, the detent 193 is lifted from between the teeth of ring gear and onto the cam member 195 (see Fig. 8). This removes the restraint applied to ring 84 and permits the ring 84 to turn with the gear 91. Thus, during that portion of each revolution of gear 91 when detent 193 is engaged by the cam member 195, the ring 84 will be moved in accordance with movement of the gear 91.

As stated before, the gear 91 has 31 teeth, so that during a 31 day month it makes a complete revolution. During such a month, the ring 84 has no effect on the cooperation between the annular plate 64 and the gear 91, due to the tooth 86. During the last three days of the month, the detent 193 is retracted, so that with each intermittent actuation of the gear 91 by the tooth 86, the ring 84 will be moved by one of the supernumerary teeth 196 through an arc corresponding to one tooth. During the remainder of the rotation of the annular plate 64 when the tooth 86 is not in engagement with the gear 91, the ring 84 is restrained from rotation by virtue of the engagement of the teeth 196 with the teeth of the ring 84. Since the gear 91 during this interval is stationary, the teeth 196 formed integral on the cam portion 195 will also be stationary. In order to restrain gear 91 from rotation due to frictional drag through the ring 84, a spring pressed detent 198 (Figure 5) is applied to the teeth of the gear 91.

For proper operation of the clock, it is necessary that the gear 91 make a complete revolution during each month. As explained hereinbefore, a 31 day month introduces no problem, inasmuch as the gear 91 has 31 teeth and may be moved once each day by the driving force of the tooth 86. However, in those months having less than 31 days, it is necessary to provide some means for accelerating completion of a revolution of the gear 91 so that by the start of the succeeding month it will have completed a revolution, as in the case of a 31 day month. It is for this purpose that the ring 84 is provided, and to this end pegs 201 are provided on the ring 84 slidable in axial bores 202 formed between certain teeth of the ring (see Fig. 7). The bore 202 may be brought into registry with any one of a plurality of similar bores 203 in plate 64 extending axially from the bottom of the groove accommodating the ring 84. The peg 201 has an annular shoulder portion 204 formed thereon, reciprocation of which is accommodated in an enlarged portion of the bore 202. A compression spring 205 surrounding the peg 201 serves to maintain the peg normally pressed outwardly of the ring 84, with the shoulder 204 bearing against the end of the enlarged portion of the bore 202. In this position the peg 201 does not extend into the complementary bore 203 in the annular plate 64, accordingly leaving the ring 84 free to rotate in the groove in the plate 64. As seen in Figure 9, depression of the peg 201 causes it to enter into the bore 203 of the plate 64, thereby locking together the ring 84 and the plate 64 during the time that the peg 201 is depressed. Inasmuch as the peg 201 protrudes between the gear teeth in the ring 84, engagement of one of the supernumerary gear teeth 196 between these teeth on the ring 84 will depress the peg 201 into the bore 203, thus locking the ring 84 to the annular plate 64.

This then is the cooperation between the plate 64 and the gear 91 during the last three days of June, for example. At midnight of June 28 at the international date line, as the tooth 86 on the plate 64 meshes with the gear 91, the first of the teeth 196 is brought into mesh with the tooth space 206 on the ring 84 (Fig. 11), and simultaneously the detent 193 is lifted out of engagement with the ring 84. The ring 84 is thus rotated by virtue of the meshing between the first tooth 196 and the tooth space 206 through an arc corresponding to one tooth. During the day on the 28th of June, the plate 64 continues its rotation while the gear 91 is restrained against any movement by the spring detent 198. The immobility of gear 91 acting through the gear teeth 196 also restrains the ring 84 against rotation.

At midnight on June 29, a similar action occurs with the rotation of gear 91 by the tooth 86 bringing the second of the teeth 196 into engagement with the tooth space 207 on the ring 84. At this point, the date June 30th appears in the windows 33 and 34 and remains there for the next 24 hours. At midnight of June 30th at the international date line the tooth 86 again engages the gear 91, moving it forward through an arc corresponding to one tooth, and bringing into registry with the window 33 the date "31". The last of the supernumerary teeth 196 is then brought into meshing engagement with the tooth space 208 on the ring 84. It will be seen in Figure 11 that the tooth space 208 is one of those having a peg 201. Accordingly, as this meshing occurs, the peg 201 is depressed into the bore 203 of the plate 64, locking the ring 84 to the plate 64. Continued rotation of the plate 64 thus produces further rotation of the gear 91 through the tooth, the teeth on opposite sides of space 208 and the engaged tooth 196, the ring 84 now being locked to the plate 64. Thus, the gear 91 is moved through an extra distance until the last of the supernumerary teeth 196 has unmeshed from the teeth on the ring 84. This extra movement produces an extra reciprocatory movement of the pitman 112, thereby moving the ribbon 125 so as to replace the displayed numeral "31" with the numeral "1."

In the meantime, and substantially simultaneously with the transition from "31" to "1" as displayed at window 36, the bell crank 177 is operated to cause the ribbon 176 to move a sufficient distance to replace the notation "June" appearing in window 37, with the notation "July." Thus, during the final few moments of June 30, the notation "June 31" will be indicated briefly, and replaced by the notation "July 1," by the extra movement of gear 91 through the operation of the pin 201 in the gear ring 84.

With the unmeshing of the last of the teeth 196 from ring 84, the detent 193 returns to position between the teeth of the ring 84, restraining the ring from further rotation.

Referring to Fig. 11, it will be seen that this condition continues through July and August and until midnight of September 30, by which time the tooth space 211 on the ring 84 has been rotated into position adjacent the gear 91, and is ready to be brought into mesh with the last of the supernumerary teeth 196. It will be understood, by reference to Fig. 11, that three teeth are provided on ring 84 for each month of the year, with the last tooth in each 30 day month being provided with a spring pressed pin 201 (Figure 7). Each of the three teeth on the ring 84 corresponding to the month of February is provided with a pin 201, inasmuch as it is necessary to accelerate the gear 91 through three extra days at midnight February 28 to effect introduction of March 1. In order to provide for leap year, the ring 84, as shown in Fig. 12, is of sufficient size to accommodate four complete years, i. e., 144 teeth, so that three of the February segments may be provided with three pegs 201 in the manner above described, while the fourth February segment is provided with only two pegs 201, thereby to accommodate the 29th day of February occurring in leap year. In this manner, all calendar contingencies are taken care of, except the quadri-centennial omission of leap year occurring at the turn of the century each 400 years. On such occasions it is necessary to manually adjust the clock.

The meshing and cooperation between the single tooth 88 and the gear 93 is quite similar to that above described for the meshing between tooth 86 and the gear 91. In this case, the toothed ring 85 is controlled by the detent 212 pivoted to the bottom wall of the gear housing 83 in a manner similar to the control of ring 84 by the detent 193. Ring 85 also has 144 teeth, three for each month in a four year cycle. Each month having less than 31 days is provided with the reciprocable pins 213, which function in exactly the same manner as do the pins 201 in the ring 84. The three supernumerary teeth 214 depend downwardly from the gear 93, as shown in Figure 9. The ring 85 compensates for short months in the information appearing on the ribbon 125 which indicates advanced dates in the same way that the ring 84 compensates for short months in the information appearing on ribbon 153 relating to delayed dates.

The manner in which the seasons and the years appearing in the windows 42 and 43 respectively are changed will now be described.

Referring to Figure 2, it will be remembered that the horizontal shaft 61 bearing the cams 57 and 58 turns at the rate of one revolution every 365¼ days. Fixed on the shaft 61 is a circular disc 221, from the obverse face of which extends a single pin 222 and from the reverse face of which extend four pins 223 symmetrically disposed around the reverse face of the disc as shown in Figure 3. A rocker arm 224, pivoted at 225, has one end disposed at the back of disc 221 for engagement by the pins 223, so that upon successive engagement of the arm 224 by the pins 223, the arm 224 will be swung clockwise. As soon as the arm 224 is free of any given pin 223, it is retracted counterclockwise by a spring 224-a which presses it against a stop member 226. The other end of arm 224 is in engagement with the ratchet wheel 227, which, through a beveled gear connection 228, effects intermittent uni-directional rotation of a sprocket spool 231. Extending about spool 231 and an idler spool 232 is a continuous ribbon 233 on which are marked the seasons of the year (Fig. 21). The spools 231 and 232 maintain the ribbon 233 in registry with the window 42 so that during each year the pins 223 successively engage the rocker arm 224 causing it to pass over the ratchet teeth of the wheel 227. Upon disengagement of the arm 224 from the pin 223, spring 224-a retracts the arm, which, by engagement with the ratchet teeth, rotates the wheel 227 clockwise and moves the ribbon 233 past the window 42 to indicate a new season.

A similar operation is effected by engagement between the single pin 222 on the disc 221, and a rocker arm 234 pivoted at 235.

The other end of the rocker arm 234 engages a ratchet wheel 236 and effectuates clockwise movement thereof through the spring 237 with each release of the arm 234 from the pin 222. Each movement of sprocket wheel 236 advances a ribbon 238 through the beveled gear connection 241. Thus, once each year, the year appearing opposite the window 43 will be advanced.

As was stated hereinbefore, the globe 44 is mounted so that its two poles may be given opposed reciprocatory motion at the same time that the globe is caused to rotate in synchronism with the dial 22. The connection for effecting this operation is shown in Figs. 2, 13, 14 and 15.

Referring to Fig. 13, a split bushing 242 is secured in coaxial relation on the dial 22, so as to rotate therewith, by a nut 243 threaded on the outer end of the bushing. The inner end of the bushing 242 has a hollow spherical portion 242-a in which is accommodated the spherical end 244-a of a sleeve 244. The bushing 242 is in driving relation with the tube 244 as by pins 244-b on the inner spherical head engaging slots 242-b in the outer head. This sleeve 244 telescopes within a tube 245 which forms the axis of the globe 44, the sleeve being in driving relation with the tube as by the cooperating splines 246 and 247 respectively on the sleeve and on the tube.

A collar or ring 248 is secured in tube 245 at the center of the globe 44. The sleeve 244 terminates some distance from the ring 248, a compression spring 249 being confined between the end of the ring and the end of the sleeve.

The opposite end of the tube 245 has a similar sleeve 250 therein (see Fig. 2), a spring 251 being confined between the inner end of the sleeve and the collar 248. The outer end of the sleeve 250 has a spherical end 250-a rotatably accommodated in the hollow spherical portion 252-a of a split bushing 252 fixed in the panel 46.

It will be clear that rotation of the dial 22 is imparted to the bushing 242, hence by pins 244-b to the sleeve 244 and thence to the globe 44, simulating rotation of the world about its axis.

The minute hand 28 is secured to a short shaft 255 rotatably mounted in the bushing 242 and connected by a universal joint 256 to one end of a shaft 257 rotatably mounted in sleeves 244 and 250. The other end of the shaft 257 is connected by a similar universal joint 258 to a stub shaft 259 mounted in bushing 252, and connected by a flexible shaft 261 to a shaft 262 mounted in the wall 71 and extending through the gear 73. Shaft 262 is driven by a pinion 263 secured thereon which meshes with an enlarged portion 74-a of gear 74. The gear ratio is such that hand 28 rotates once every hour.

The universal joints 256 and 258 are concentric with the respective spherical heads 244-a and 252-a in which they are accommodated. It will be apparent that the distance between these heads 244-a and 252-a will vary in accordance with the inclination of the tube 245 representing the earth's axis. Accordingly shaft 257 has a slip joint 257-a (Fig. 13) to permit corresponding variations in the length of the shaft.

The distance between the inner ends of the sleeves 244 and 250 also varies. The collar 248 serves in cooperation with either spring 249 or spring 251 to support the globe axially on sleeve 244 or sleeve 250 depending on which way the axis of globe 44 is inclined. As shown, the globe is supported axially by spring 249, sleeve 244 and bushing 242.

To concentrate the light from source 45 on the globe 44, the source 45 is mounted in a reflector 265 directed downwardly toward the globe 44. A mirror 266 is mounted on the plate 46 facing toward the dial 22 so that the inner portion of the globe 44 adjacent the north pole 264 may be more readily observed. In this connection, it is preferred not to print letters or names on the face of the globe 44, but to rely for geographical recognition on the contour of the lines imprinted on the globe.

Brief consideration will show that the advance of the day of the week and day of the month indicating ribbons will impose suddenly a greatly augmented load of brief duration so that a much larger power source will be required for a short interval once every 24 hours, than is otherwise necessary for operation of the clock. Accordingly in a modified form it is proposed to provide an auxiliary power source for operating these ribbons, appropriately controlled by the clock.

Thus referring to Fig. 23, a fragment of the dial 22 is shown as carrying an annular plate 270, corresponding to the plate 64, and having peripheral teeth 271 as well as rotatably mounted ring gears 272 and 273 in annular grooves 274 and 275 respectively. Auxiliary moving contacts 276 and 277 are mounted for limited transverse movement in through openings 274-a and 275-a of limited angular extent in the grooves 274 and 275. Moving contacts 278, 279 and 280 also are mounted for limited transverse movement in through openings provided in plate 270 spaced radially between the grooves 274 and 275. Operating members 282, 283 and 284 are provided for cooperating respectively with the gear wheels 91-a, 92-a and 93-a, corresponding with gears 91, 92 and 93 of the first described form, to close circuits through the contacts controlling small motors 91-b, 92-b and 93-c for operating the respective gears.

Since these operating members are substantially identical only one such as that one denominated 283 will be described.

Thus an arcuate housing 285 of channel shaped cross section is stationarily mounted with its open side closely spaced to the plate 270 and slidingly mounts the member 283 for cooperation with the gear 92-a which for this purpose may have specially formed teeth. As clearly shown in Fig. 24, the member 283 has a tongue 283-a adapted to advance between the periphery of the gear 92-a and the plate 270 as well as a thickened rear portion 283-b with a tooth or cam 283-c formed thereon. The member 283 has a rear extension or stem 286 slidably extending through an apertured block 287 secured in the housing 285. A light compression spring 288 confined on the stem 286 between the block 287 and the rear end of the member 283 urges the member to advance, such advance being limited by a stop 286-a provided on the stem 286.

The member 283 has a tooth 289 formed thereon adapted for engagement by a spring pressed detent 290 so as to be releasably retained in retracted position. As clearly shown in Fig. 23, the detent 290 is common to all three housings 285, the exposed portions between the housings being engageable by cam means 291 on the plate 270 to release the members 282, 283 and 284 in response to rotation of the dial 22 and plate 270.

A stationary insulating plate 292 is mounted adjacent the side of plate 270 opposite the gears 91-a etc., and has a plurality of stationary contacts thereon. Thus there is contact 293 adapted for engagement by the moving contacts 276 and 278, contact 294 for engagement by the moving contact 279, and contact 295 for engagement by the moving contacts 277 and 280.

The moving contacts 278, 279 and 280 are intended to cause advance respectively of the gears 91-a, 92-a and 93-a corresponding to that caused by the single teeth 85, 86 and 87. For this purpose they are located in plate 270 so that as the clock indicates midnight the contacts 278, 279 and 280 engage the tongue of the corresponding operating member 282, 283 or 284 and the corresponding stationary contact 293, 294 or 295. This energizes each of the motors 91-b, 92-b and 93-b through the circuit shown in Fig. 25, so that the motors rotate the respective gears 91-a, 92-a and 93-a in a clockwise direction (Fig. 24).

Referring to Fig. 24 which is typical, as the gear 92-a turns, the member 283 is forced to the right, the parts being so proportioned that when the gear 92-a has advanced one tooth, the member 283 will move to the right a sufficient distance to cause the tooth 289 to be engaged by detent 290, to break the circuit between the member 283 and contacts 279 and 294 and free the tooth 283 from the teeth of gear 92-a.

The detent 290 retains the operating members 283, 284 and 285 in retracted position until just before midnight when the advance of plate 270 causes the cams 291 to release the detent 290 and allow the members to move to their advanced positions. The cams are so positioned that such release occurs in time to allow the members to reach their advanced positions for proper cooperation with the moving contacts. Further, the parts are so proportioned and arranged that movement of the contacts 278, 279 and 280 by the rotation of plate 270 can not close the circuits with the members 282, 283 and 284 in retracted position.

It is to be understood that the ring gears 272 and 273 are substantially identical in construction and operation with the gears 84 and 85 of the first described form, and cooperate respectively with supernumerary teeth 196 on the gear 91-a, teeth 214 on the gear 93-a and latching detents 193 and 212.

In the modified form, however, the pin 201 and the pin 213 cooperate respectively with the moving contacts 276 and 277 to maintain the motors 91-b and 93-b energized to impart the required extra movement to the gears 91-a and 93-a.

I claim:

1. In a horological device, means forming a fixed circular scale member graduated in accordance with the hours of a twenty four hour day, a rotatable globe simulating the earth mounted behind said scale member and having one pole substantially at the center of said scale, a member indicating the meridians of said globe connected with the globe at said one pole for rotation with the globe at a point in front thereof and cooperating with the fixed scale member to indicate the time of day, a source of light mounted above the globe in a position such that light rays therefrom are directed toward said globe in a plane which passes through the center of the globe and the noon point on said scale member, and means for rotating the globe and said indicating means in accordance with the rotation of the earth.

2. In a horological device, means forming a fixed circular scale graduated in accordance with the hours of a twenty four hour day, a transparent member rotatable with respect to said means once in twenty four hours and having graduations in accordance with the earthly meridians cooperating with said scale to indicate the time of day, and a globe simulating the earth visible through said member and rotatable therewith, one pole of said globe coinciding substantially with the axis of said member.

3. In a horological device, means forming a fixed circular scale graduated in accordance with the hours of a twenty four hour day, a transparent member rotatable with respect to said means once in twenty four hours and having graduations in accordance with the earthly meridians cooperating with said scale to indicate the time of day, a globe simulating the earth visible through said member and rotatable therewith, one pole of said globe coinciding substantially with the axis of said member and a source of light simulating the sun directed toward the globe.

4. In a horological device, means forming a fixed circular scale graduated in accordance with the hours of a twenty four hour day, a transparent member rotatable with respect to said means once in twenty four hours and having graduations in accordance with the earthly meridians cooperating with said scale to indicate the time of day, a globe simulating the earth visible through said member and rotatable therewith, one pole of said globe coinciding substantially with the axis of said member, a source of light simulating the sun directed toward the globe, and means for altering the inclination of the axis of the globe in accordance with the rotation of the transparent member.

5. In a horological device, a globe simulating the earth and having an axis, a pair of relatively movable means supporting said globe adjacent the opposite ends of said axis, including swivel connections between said globe and said supporting means, means for moving at least one of said supporting means to vary the inclination of said axis through a cycle between a pair of limiting positions, and an indicator operated cyclically by said moving means.

6. In a horological device, a globe simulating the earth and having an axis, a pair of relatively movable means supporting said globe adjacent the opposite ends of said axis, including swivel connections between said globe and said supporting means, means for moving at least one of said supporting means to vary the inclination of said axis between a pair of limiting positions, a fixed source of light mounted above said globe for directing light toward said globe along a line transverse to said axis substantially midway between said limiting positions, and indicating means operated in accordance with the inclination of said axis.

7. In a horological device, a globe simulating the earth and having an axis, relatively movable upright members, means for rotatably supporting the globe adjacent the opposite ends of said axis in swivelled connection with said members, a rotatable element connected in driving relation with said globe, means driving said element at a rate such that said globe is rotated in accordance with the rotation of the earth, a pair of cooperating scale members for indicating the hours of the day, one of said scale members being carried by said element, and means for moving at least one of said supporting members to vary the inclination of said axis in accordance with the rotation of the globe.

8. In a horological device, a globe simulating the earth and having an axis, means rotatably supporting the globe adjacent the opposite ends of said axis, one of said means including a rotatable dial connected with said globe, means rotating said dial in accordance with the rotation of the earth, a scale on said dial graduated in accordance with the earthly meridians, a cooperating stationary scale graduated in accordance with the hours of the day, and means for moving at least one of said supporting means to vary the inclination of said axis between a pair of limiting positions in accordance with the rotation of said globe, a fixed source of light directed toward said globe along a line transverse to said axis substantially midway between said limiting positions.

9. In a horological device, a globe simulating the earth and having an axis, means rotatably supporting the globe adjacent the opposite ends of said axis, one of said means including a rotatable dial connected with said globe, means rotating said dial in accordance with the rotation of the earth, a scale on said dial graduated in accordance with the earthly meridians, a cooperating stationary scale graduated in accordance with the hours of the day, means for moving at least one of said supporting means to vary the inclination of said axis between a pair of limiting positions in accordance with the rotation of said globe, a fixed source of light directed toward said globe along a line transverse to said axis substantially midway between said limiting positions, and means operated in response to rotation of said dial for indicating the dates of successive days.

10. In a horological device, a globe simulating the earth and having an axis, means rotatably supporting the globe adjacent the opposite ends of said axis, one of said means including a rotatable dial connected with said globe, means rotating said dial in accordance with the rotation of the earth, a scale on said dial graduated in accordance with the earthly meridians, a cooperating stationary scale graduated in accordance with the hours of the day, means for moving at least one of said supporting means to vary the inclination of said axis between a pair of limiting positions in accordance with the rotation of said globe, a fixed source of light directed toward said globe along a line transverse to said axis substantially midway between said limiting positions, means operated in response to rotation of said dial for indicating the dates of successive days, and indicating means operated in response to the arrival of said axis at a predetermined inclination.

11. In a horological device, a globe simulating the earth and having an axis, movable means mounting said globe adjacent the opposite ends of said axis, means guiding said mounting means for parallel movement, means supporting said mounting means comprising a rotatable shaft extending transversely of the direction of said movement and having a pair of oppositely directed cam means respectively engaging said mounting means, means for driving said shaft, and an indicator operated in response to the arrival of said shaft at a predetermined angular position.

12. In a horological device, a globe simulating the earth and having an axis, movable means mounting said globe adjacent the opposite ends of said axis, means guiding said mounting means for parallel movement, means supporting said mounting means comprising a rotatable shaft extending transversely of the direction of said movement and having a pair of oppositely directed cam means respectively engaging said mounting means, means for driving said shaft, and a pair of indicators responsive to the rotation of said shaft, one of said indicators being operated upon arrival of said shaft at each of several predetermined angular positions spaced 90° apart, the other indicator being operated upon arrival of said shaft at a predetermined angular position once each revolution.

13. In a horological device, an annular member adapted to make one revolution per day, a cooperating driven member having teeth corresponding in number with the maximum number of days in a month, means whereby said annular member advances said driven member at the rate of one tooth for each revolution of the annular member, a ring gear mounted on said annular member for rotation relative thereto, detent means for restraining said ring gear against rotation with said member, means on said driven member providing a restricted number of supernumerary teeth adapted to engage said ring gear, cam means on said driven member adapted to operate said detent to release said ring gear upon engagement of the supernumerary teeth therewith, means operated by said engaging teeth to cause said ring gear to rotate and thereby impart supplementary rotation to said driven member, said means ceasing to operate upon disengagement of said teeth, and indicating means operated by said driven member.

14. In a horological device, an annular member adapted to make one revolution per day, a cooperating driven member having teeth corresponding in number with the maximum number of days in a month, means forming a projection on said annular member adapted to engage the teeth on said driven member and advance said member at the rate of one tooth for each revolution of the annular member, a ring gear mounted on said annular member for rotation relative thereto, detent means for restraining said ring gear against rotation with said annular member, means on said driven member providing a restricted number of supernumerary teeth adapted to engage said ring gear, cam means on said driven member adapted to operate said detent to release said ring gear upon engagement of the supernumerary teeth therewith, means operated by said engaging teeth to secure the ring gear to said annular member to rotate therewith and thereby impart supplementary advance to said driven member, said means being released upon disengagement of said teeth, and indicating means operated by said driven member.

15. In a horological device, an annular member adapted to make one revolution per day, a pair of driven members, each having teeth corresponding in number with the maximum number of days in a month, means whereby said annular member advances each of said driven members at the rate of one tooth for each revolution of the annular member, a ring gear mounted on said annular member for rotation relative thereto, detent means for restraining said ring gear against rotation with said member, means on one of said driven members providing a restricted number of supernumerary teeth adapted to engage said ring gear, cam means on said one driven member adapted to operate said detent to release said ring gear upon engagement of the supernumerary teeth therewith, means operated by said engaging teeth to cause said ring gear upon engagement of the supernumerary teeth therewith, means operated by said engaging teeth to cause said ring gear to rotate and thereby impart supplementary rotation to said one driven member, said means ceasing to operate upon disengagement of said teeth, and indicating means operated by each of said driven members.

16. In a horological device, an annular member adapted to rotate once per day, a plurality of driven members disposed coaxially, each of said members having teeth corresponding in number with the maximum number of days in a month, driving means radially spaced on said annular member whereby said member simultaneously advances each of said driven members at the rate of one tooth for each revolution of the annular member, and means for imparting supplementary advance to one of said driven members, including a ring gear mounted on said annular member for rotation relative thereto, and radially spaced from said driving means, detent means for restraining said ring gear against rotation with said member, means forming supernumerary teeth on one of said driven members adapted to engage said ring gear, means for releasing said detent upon engagement of said teeth with the ring gear, means for causing said ring to rotate during such engagement to supplementarily advance said driven member, and indicating means operated by each of said driven members.

17. In a horological device, a rotatable annular member, power means driving said member at the rate of one revolution per day, a driven member having teeth corresponding in number with the maximum number of days in a month, an electric motor for driving said driven member, switch means cooperatively controlled by said annular member and said driven member to close and thereby energize said motor upon arrival of said annular member at a predetermined angular position, and to open upon a predetermined advance of said driven member, and indicating means operated by said driven member.

13. In a horological device, a rotatable annular member, power means driving said member at the rate of one revolution per day, a driven member having teeth corresponding in number with the maximum number of days in a month, an electric motor for driving said driven member, switch means cooperatively controlled by said annular member and said driven member to close and thereby energize said motor upon arrival of said annular member at a predetermined angular position, and to open upon a predetermined advance of said driven member, a ring gear mounted on said annular member for rotation relative thereto, detent means for restraining said ring gear against rotation with said member, means on said driven member providing a restricted number of supernumerary teeth adapted to engage said ring gear, cam means on said driven member adapted to operate said detent to release said ring gear upon engagement of the supernumerary teeth therewith, switch means operated to close by said engaging teeth for energizing said motor to impart supplementary rotation to said driven member, and operated to open upon disengagement of said teeth to deenergize said motor, and indicating means operated by said driven member.

19. In a horological device, means forming a fixed circular scale member graduated in accordance with hours of a twenty-four hour day, a rotatable globe simulating the earth mounted to one side of said scale member and visible therethrough, a member indicating the meridians of the globe being connected thereto for rotation therewith and cooperating with the fixed scale member to indicate the time of day, a source of light mounted above said globe for directing light downwardly toward the globe in a plane passing through the noon point of the scale on said scale member, and means for rotating the globe and said indicating member in accordance with the rotation of the earth.

20. In a horological device, means forming a fixed circular scale graduated in accordance with the hours of a twenty-four hour day, a member rotatable with respect to said means once in twenty-four hours and having graduations in accordance with the earthly meridians cooperating with said scale to indicate the time of day, and a globe simulating the earth mounted for rotation with said member to one side thereof and through which said globe may be viewed, one pole of said globe coinciding substantially with the axis of said member.

21. In a horological device, means forming a fixed circular scale graduated in accordance with the hours of a twenty-four hour day, a member rotatable with respect to said means once in twenty four hours and having graduations in accordance with the earthly meridians cooperating with said scale to indicate the time of day, a globe simulating the earth mounted for rotation with said member to one side thereof and through which said globe may be viewed, one pole of said globe coinciding substantially with the axis of said member, and a source of light fixed above the globe for directing light rays onto the exterior surface of the globe in simulation of light from the sun.

22. In a horological device, means forming a fixed circular scale graduated in accordance with the hours of a twenty-four hour day, a member rotatable with respect to said means once in twenty-four hours and having graduations in accordance with the earthly meridians cooperating with said scale to indicate the time of day, a globe simulating the earth mounted for rotation with said member to one side thereof and through which said globe may be viewed, one pole of said globe coinciding substantially with the axis of said member, a source of light fixed above the globe for directing light rays onto the exterior surface of the globe in simulation of light from the sun, and means for altering the inclination of the globe in accordance with the rotation of said member.

23. In a horological device, a globe simulating the earth and having an axis, means rotatably supporting the globe adjacent the opposite ends of said axis, a rotatable member connected with said globe and through which the globe may be viewed, means rotating said member in accordance with the rotation of the earth, a scale on said member graduated in accordance with the earthly meridians, a cooperating stationary scale graduated in accordance with the hours of the days, and means for moving at least one of said supporting means to vary the inclination of said axis in accordance with the rotation of said globe, a fixed source of light directed toward said globe along a line transverse to said axis.

24. In a horological device, a globe simulating the earth having an axis, means rotatably supporting the globe adjacent the opposite ends of said axis, a rotatable member connected with said globe, means rotating said member in accordance with the rotation of the earth, a scale on said member graduated in accordance with the earthly meridians, a cooperating stationary scale graduated in accordance with the hours of the day, means for moving at least one of said supporting means to vary the inclination of said axis in accordance with the rotation of the globe, a fixed source of light directed toward said globe along a line transverse to said axis, means operated in response to rotation of said member for indicating the dates of successive days, and indicating means operated in response to arrival of said axis at an inclined position.

JOHN C. PACKARD.

REFERENCES CITED

The following references are of record in the file of this patent:

UNITED STATES PATENTS

| Number | Name | Date |
|---|---|---|
| 128,854 | Clinton et al. | July 9, 1872 |
| 594,410 | Margolis | Nov. 30, 1897 |
| 1,750,505 | Bulka | Mar. 11, 1930 |
| 1,959,601 | Schulse | May 22, 1934 |
| 2,023,677 | Fowler | Dec. 10, 1935 |
| 2,056,089 | Boggs | Sept. 29, 1936 |
| 2,126,469 | Huston | Aug. 9, 1938 |